Aug. 31, 1926.

H. K. CLEMONS 1,597,722

TRACTOR HITCH

Filed Nov. 1, 1923    2 Sheets-Sheet 1

Inventor
Harry K. Clemons
By his Attorneys
Merchant and Kilgore

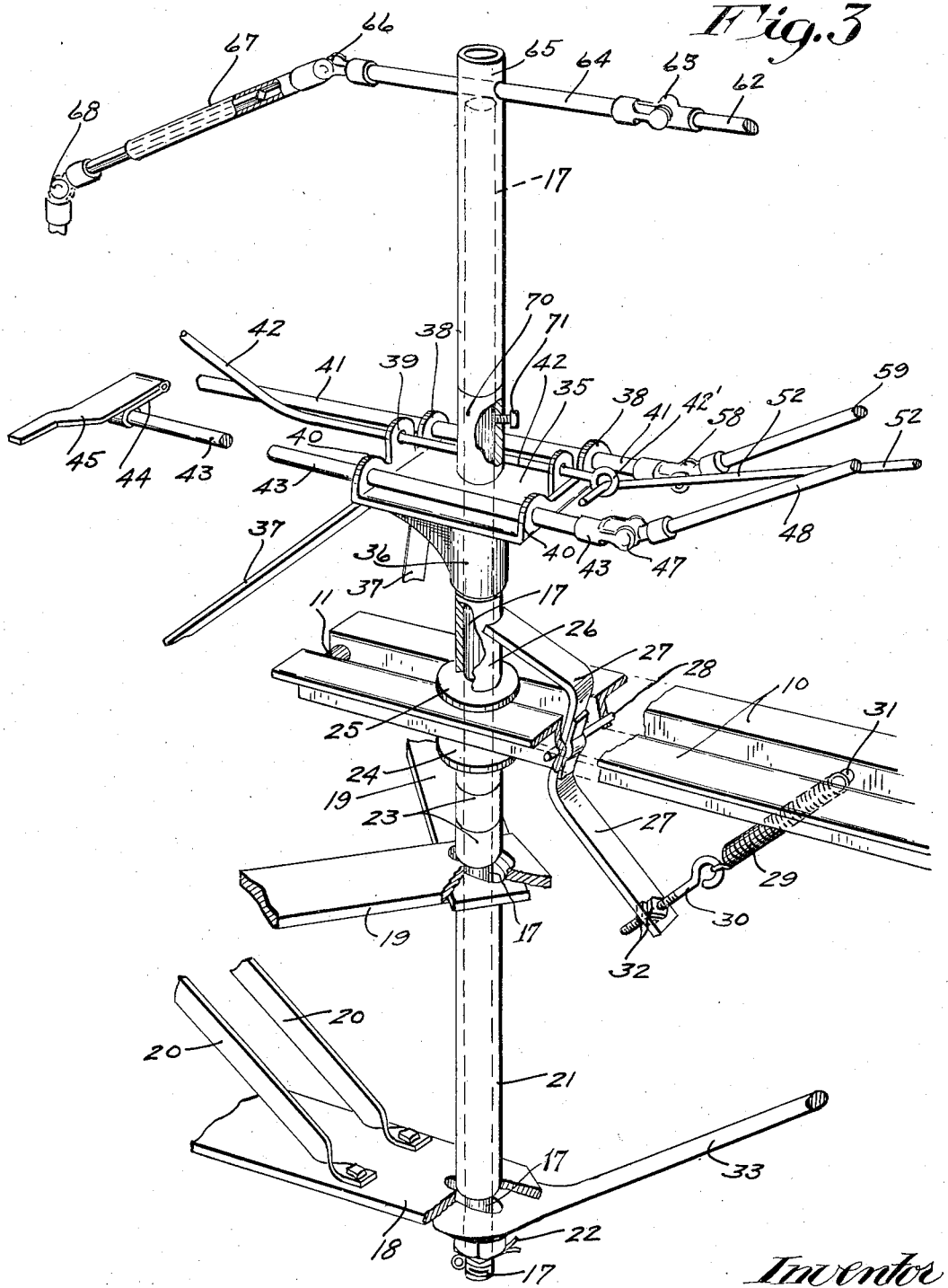

Patented Aug. 31, 1926.

1,597,722

UNITED STATES PATENT OFFICE.

HARRY K. CLEMONS, OF ST. PAUL, MINNESOTA.

TRACTOR HITCH.

Application filed November 1, 1923. Serial No. 672,125.

My present invention provides an improved tractor hitch adapted for use to operatively connect a road grader or other truck or wheel-equipped vehicle, to the rear of a tractor, of the well known Fordson type, and to such ends, generally stated, the invention consists of the novel devices and combinations of devices hereinafter described and defined in the claims.

This improved hitch is especially adapted for connecting to the front of a two-wheeled grader or two-wheeled truck equipped with an operator's seat at the rear and having controlling devices, such as a steering connection, a gear shift connection, a clutch connection, and a throttle valve operating connection, arranged to be manipulated from the operator's seat to control the above indicated functions of the tractor while permitting free oscillatory or horizontal pivotal movements of the tractor in respect to the road grader or truck.

In the accompanying drawings, which illustrate the invention, I have shown my improved tractor hitch used to connect a road grader to a tractor of the Fordson type.

Figure 1:
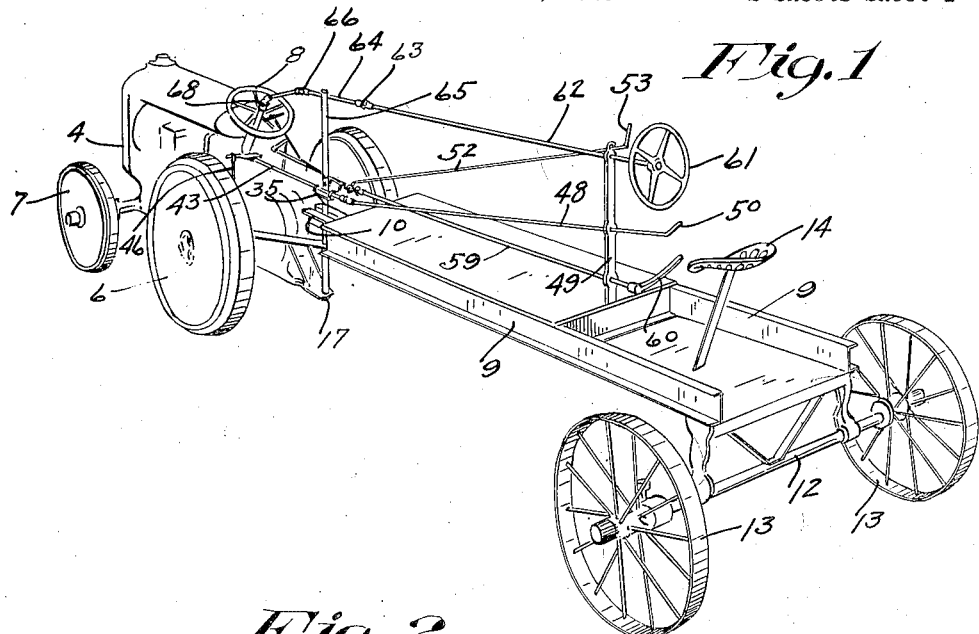
Figure 2:
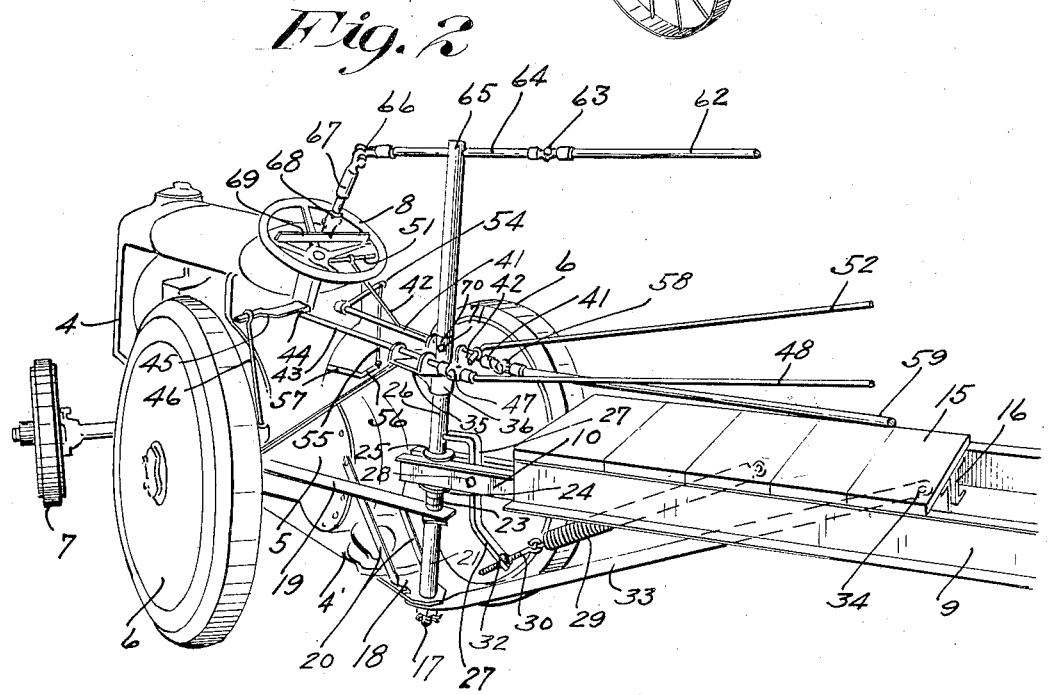

Referring to the drawings, wherein like characters indicate like parts throughout the several views, Fig. 1 is a perspective showing the improved hitch applied as just above indicated, the tractor and the road grader being indicated diagrammatically or by light lines;

Fig. 2 is a view corresponding to Fig. 1, but on a larger scale and the rear portion of the grader being broken away; and Fig. 3 is a perspective on a larger scale than either of the other views, illustrating particularly the structure of the tractor hitch.

Of the parts of the tractor, it is desirable for the purposes of this case only to indicate the main frame 4, the rear axle casing 5, the rear traction wheels 6, the oscillatory front wheels 7, and a hand-operated steering wheel 8.

Of the parts of the road grader, it is only desirable to note the main frame 9 provided with forwardly projecting lateral spaced reach beams 10, shown as spaced from their front ends by a tie-bolt 11; the rearwardly located axle 12, equipped with rearwardly located wheels 13; and the operator's seat 14 supported on the rear portion of the frame 9. In the arrangement illustrated, a short deck plate 15 is rigidly secured to the front portion of the frame 9 and short inner beams 16 are rigidly secured to said deck and to the main bars of said frame 9.

One of the main elements of my improved hitch is an upright pivot post 17 that is securely supported in an upright position by suitable connections to the fixed framework of the tractor. This is preferably accomplished by a lower post support in the form of a plate-like metal bracket 18 that is bolted or otherwise rigidly secured to a heavy lug 4', such as is found on the rear axle casing 5 of a Fordson tractor, and by an upper support afforded by heavy metal bars 19 bolted or otherwise rigidly secured at their front ends to the end portions of the axle casing 5. The lower bracket 18 is further connected to the rear axle casing 5 by oblique brace bars 20. The bars 19 converge rearwardly and are overlapped, so that the post 17 is passed therethrough and through the lower bracket 18 and is thereby held in an upright position. A long spacing sleeve 21 is placed on the post 17 between the lower supporting bracket 18 and the lapped ends of the bars 19. As shown, the lower end of the post 17 is threaded and provided with a nut 22. Loosely placed on the post 17, just above the bars 19, is a plurality of short sleeves 23, and on the upper sleeve 23 is placed a washer 24.

The reach 10 is shown as made up of a pair of laterally spaced angle bars which straddle or embrace that portion of the post 17 that is immediately above the washer 24, so that said angle bars rest on said washer. A washer 25 is placed on the post 17 and rests on the upper portions of the reach-forming angle bars 10. A short sleeve 26 is placed on the post 17 just above the washer 25 and this sleeve is engaged by the upper end of a presser lever 27 that is intermediately pivoted to the angle bars of the reach 10 at 28 and has an obliquely extended lower end spring-connected to said reach. The spring connection just noted, as shown, comprises a strong coiled spring 29 and an eye-bolt 30 connected thereto. Said spring 29, at its upper end, is anchored to the reach 10 by a pin 31. The eye-bolt 30 extends through the lower end of the lever 27 and below the same is provided with a nut 32, by adjustments of which adjustments of the spring 29 may be varied. The purpose of this spring device and lever will be hereinafter noted.

A strong drawbar 33 is pivotally connected at its front end on the lower end of the pivot post 17, and at its rear end is pivotally connected at 34 to the beams 16 or other suitable part of the frame 9 of the road grader. By reference to Fig. 3 it is important to note that the holes in the bars 19 and in the bracket 18 and the draw bar 33 are elongated to permit slight vertical wabble movement of said post.

For supporting intermediate portions of several of the control devices, I provide a bearing head 35 having a vertical centrally located sleeve 36 spaced above the short sleeve 26 and through which the steering post 17 is freely passed. This bearing head 35 is held against rotation and quite rigidly secured to the tractor frame by forwardly and downwardly diverging brace bars 37, the front ends of which are bolted or otherwise rigidly secured to the rear axle casing 5 of the tractor. Said bearing head is provided with three pairs of upstanding bearing ears 38, 39 and 40, in which, respectively, are mounted operating shafts 41, 42 and 43. The front end of the shaft 43 carries a short arm 44 that is pivotally connected to a long arm 45, the free end of which is pivoted to the upper end of the gear shift lever 46 of the tractor transmission mechanism. The shaft 43 is not only free to oscillate, but to move endwise, so that the shift lever 46 may be given all of those movements required to set the same in neutral, forward drive and reverse. The rear end of the shaft 43 is connected by a knuckle joint 47 to an operating shaft 48, the rear end of which is mounted for rotary and sliding movements through a guide post 49 rigidly secured on the frame of a truck or grader. Within reach of the operator's seat, the shaft 48 is provided with a hand piece 50.

The front end of the shaft 42 is connected to the throttle arm 51 of the tractor engine and operates the throttle by endwise movement. At its rear end, the shaft or rod 42 is shown as provided with an eye 42' that is engaged by the laterally bent end of an operating rod 52, the rear end of which latter moves slidably through the upper end of the guide post 49 and terminates in a hand piece 53 that is within reach from the operator's seat. The front end of the shaft 41 is provided with an arm 54 that is connected by a short rod 55 to an arm 56 of a clutch-operating shaft 57 of the transmission mechanism of a tractor. The rear end of the shaft 41 is connected by a knuckle joint 58 to the front end of a shaft 59, the rear end of which is mounted in the guide post 49 and is provided with a foot piece 50 located within reach from the operator's seat.

For manipulating the steering wheel 8 from the operator's seat 14, I provide a secondary steering wheel 61 located within reach of said seat and secured to the rear end of a shaft 62, the front end of which is connected by a knuckle joint 63 to a short intermediate shaft 64 journaled in the upper end of a bearing sleeve 65, which latter is telescoped over the upper end of the pivot post 17. The front end of the shaft 64 is connected by a knuckle joint 66 to a short oblique shaft 67, the lower front end of which is connected by a knuckle joint 68 to a small bar 69 that is bolted or otherwise rigidly secured to the main or primary steering wheel. Obviously, by rotation of the secondary steering wheel 61, the primary steering wheel 8 may be correspondingly oscillated and the tractor may be steered by the operator on the rearwardly located seat 14. In fact, it is evident that all of the several functions necessary to control the tractor and which are usually controlled from the seat on the tractor, may be controlled from the rearwardly located seat on a grader or coupled truck.

It will be noted that the extreme front portion of the grader or truck frame is very narrow and that the pivotal connection between the tractor and grader is around the axis of the steering post 17, so that plenty of clearance is given for permitting the tractor to be turned with the coupled grader on the most abrupt curve that the tractor itself is capable of turning. It will also be noted that the grader is drawn by and through the drawbar 33 and not through the reach 10, but that said reach rests on the washer 24 and supports the front portion of the grader frame from the pivotal connection. When the tractor is running over undulatory ground or roads, the front wheels of the tractor will rise and fall in respect to the plane on which the rear wheels of the tractor and the rearwardly located wheels of the grader rest, and this will cause a vertical angular movement between the tractor and the grader. Under such movements, the steering post oscillates slightly in the space between the two bars of the reach 10, moving pivotally or on the lower bearing bracket or plate 18. Such rearward rocking movements of the steering post is permitted by the spring 29, but the said spring, acting through the lever 27, resists such movement and tends to force the upper portion of the steering post forward. Moreover, said spring tends to carry a part of the weight of the load of the front portion of the grader frame. To adjust the front end of the reach 10 to a lower position than is shown in the drawings, it is only necessary to move one or more of the short sleeves 23 from position below the reach and to transfer the same onto the pivot post 17 to a position above the upper washer 25 and below the sleeve 36 of the bearing head 35. To hold the pivot shaft 17 against dropping, a short sleeve 70 is placed thereon between the sleeve 65 and the sleeve of the bearing head 35, and a set screw 71 is screwed through said sleeve 70 and impinges on said shaft.

What I claim is:

1. The combination with a tractor and pivot post supports secured to and projecting rearwardly therefrom, of a pivot post carried by said supports, a truck having a reach pivotally connected to said post, and a drawbar pivoted to said post and attached to the frame of said truck.

2. The combination with a tractor and pivot post supports secured to and projecting rearwardly therefrom, of a pivot post carried by said supports, a truck having a reach pivotally connected to said post, and a drawbar pivoted to said post and attached to the frame of said truck, said reach being capable of limited endwise sliding movement on said pivot post.

3. The combination with a tractor and pivot post supports secured to and projecting rearwardly therefrom, of a pivot post carried by said supports, a truck having a reach pivotally connected to said post, a drawbar pivoted to said post and attached to the frame of said truck, said reach being capable of limited endwise sliding movement on said pivot post, and in further combination with a lever pivoted to said reach and pressing forward on the intermediate portion of said post, and a spring connecting said lever to the truck frame and exerting a force tending to press the steering post forward.

4. The combination with a tractor, and upper and lower pivot post supports secured to and projecting rearward therefrom, of a pivot post carried by said supports, a truck having rear wheels and a forwardly projecting reach, which reach is pivoted to the intermediate portion of said post, and a drawbar pivotally connected at its front end to the lower post support by said pivot post and attached at its rear end to the frame of said truck.

5. The structure defined in claim 4 in which said reach is bifurcated so that it embraces said pivot post and has a limited endwise movement in respect thereto.

6. The structure defined in claim 4 in which said reach is bifurcated so that it embraces said pivot post and has a limited endwise movement in respect thereto, a lever intermediately pivoted to said reach with its upper end pressing forward on the intermediate portion of said pivot post, and a tension spring attached to the lower end of said lever and anchored to the frame of the truck.

7. The structure defined in claim 1 in which the movable spacing sleeves are placed on said steering post between the upper post support and said reach.

8. The structure defined in claim 1 in which the movable spacing sleeves are placed on said steering post between the upper post support and said reach, the said spacing sleeves being applicable to said steering post both above and below said reach.

9. The combination with a tractor and pivot post supports secured to and projecting rearwardly therefrom, of a pivot post carried by said supports, a truck having a reach pivotally connected to said post, and a drawbar pivoted to said post and attached to the frame of said truck, said truck having a rearwardly located seat, and in further combination with a plurality of tractor-controlling connections extended forward from the vicinity of said seat to said tractor and having jointed intermediate portions supported by said pivot post.

10. The combination with a tractor and pivot post supports secured to and projecting rearwardly therefrom, of a pivot post carried by said supports, a truck having a reach pivotally connected to said post, a drawbar pivoted to said post and attached to the frame of said truck, a bearing head supported on the intermediate portion of said pivot post, and a plurality of tractor-controlling connections including jointed shafts, the intermediate portions of which are mounted on said bearing head.

11. The combination with a tractor and pivot post supports secured to and projecting rearwardly therefrom, of a pivot post carried by said supports, a truck having a reach pivotally connected to said post, and a drawbar pivoted to said post and attached to the frame of said truck, said tractor having a steering wheel, said truck having a rearwardly located seat, a secondary steering wheel supported within reach of said seat, and a jointed shaft connecting said secondary steering wheel to the steering wheel of said tractor and including a shaft section supported by said steering post.

12. The combination with a tractor and pivot post supports secured to and projecting rearwardly therefrom, of a pivot post carried by said supports, a truck having a reach pivotally connected to said post, and a drawbar pivoted to said post and attached to the frame of said truck, said tractor having a steering wheel, said truck having a rearwardly located seat, a secondary steering wheel supported within reach of said seat, a jointed shaft connecting said secondary steering wheel to the steering wheel of said tractor, and a sleeve mounted on the upper end of the steering post and in which sleeve an intermediate section of said jointed shaft is journaled.

13. The structure defined in claim 4 in further combination with a bearing head supported on said pivot post above said upper post support, a plurality of tractor-controlling connections including jointed shafts, the intermediate portions of which shafts are mounted on said bearing head.

14. The structure defined in claim 4 in further combination with a bearing head mounted on said post above the upper post support, a sleeve mounted on said post above said bearing head, a plurality of tractor-controlling connections including jointed shafts, the intermediate portions of which are mounted in said bearing head, and a steering connection in the form of a jointed shaft, one section of which is journalled in said bearing sleeve and the front end of which is connected to the steering wheel of the tractor.

15. The structure defined in claim 4 in further combination with a bearing head supported on said pivot post above said upper post support, a plurality of tractor-controlling connections including jointed shafts, the intermediate portions of which shafts are mounted on said bearing head, said truck having a rearwardly located seat and the said tractor-controlling connections at their rear ends being extended to within reach from said seat.

16. The structure defined in claim 4 in further combination with a bearing head supported on said pivot post above said upper post support, a plurality of tractor-controlling connections including jointed shafts, the intermediate portions of which shafts are mounted on said bearing head, said truck having a rearwardly located seat and the said tractor-controlling connections at their rear ends being extended to within reach from said seat, and a secondary steering wheel on the rear end of the said steering connection, also located within reach of said seat.

In testimony whereof I affix my signature.

HARRY K. CLEMONS.